US011923588B2

(12) United States Patent
Li et al.

(10) Patent No.: US 11,923,588 B2
(45) Date of Patent: Mar. 5, 2024

(54) SINGLE-LAYER CROSS-COUPLED FILTER

(71) Applicants: PROSE TECHNOLOGIES (SUZHOU) CO., LTD., Suzhou (CN); PROSE TECHNOLOGIES LLC, Mount Olive, NJ (US)

(72) Inventors: Dunrong Li, Hwaseong (KR); Renhu Luo, Yongin (KR); Ze Yin, Suzhou (CN); Jian Lu, Suzhou (CN)

(73) Assignees: PROSE TECHNOLOGIES (SUZHOU) CO., LTD., Suzhou (CN); PROSE TECHNOLOGIES LLC, Mount Olive, NJ (US)

( * ) Notice: Subject to any disclaimer, the term of this patent is extended or adjusted under 35 U.S.C. 154(b) by 75 days.

(21) Appl. No.: 17/377,748

(22) Filed: Jul. 16, 2021

(65) Prior Publication Data

US 2021/0344094 A1 Nov. 4, 2021

Related U.S. Application Data

(63) Continuation of application No. PCT/CN2019/072153, filed on Jan. 17, 2019.

(51) Int. Cl.
*H01P 1/203* (2006.01)
*H01P 1/205* (2006.01)
*H01P 7/06* (2006.01)

(52) U.S. Cl.
CPC ........ *H01P 1/2053* (2013.01); *H01P 1/20381* (2013.01); *H01P 7/06* (2013.01)

(58) Field of Classification Search
CPC ........ H01P 1/2053; H01P 1/205; H01P 1/202; H01P 1/20; H01P 1/201; H01P 1/203;
(Continued)

(56) References Cited

U.S. PATENT DOCUMENTS 7,659,799 B2 2/2010 Jun et al.
2017/0263992 A1* 9/2017 Nita ...................... H01P 1/2053
(Continued)

FOREIGN PATENT DOCUMENTS

CN 101546854 A 9/2009
CN 104993200 A 10/2015
(Continued)

OTHER PUBLICATIONS

The World Intellectual Property Organization (WIPO) International Search Report With Translation and Written Opinion for PCT/CN2019/072153 dated Oct. 17, 2019 6 Pages (including translation).

*Primary Examiner* — Stephen E. Jones
(74) *Attorney, Agent, or Firm* — ANOVA LAW GROUP, PLLC

(57) ABSTRACT

A single-layer cross-coupling filter includes a cavity in which a receiving space is formed; an integrally formed resonant structure installed in the receiving space; and at least one partition wall. The resonant structure includes at least two rows of resonant units distributed along a signal transmission path. The at least two rows of resonant units are located in a same plane of the receiving space, and each row of the resonant units includes a plurality of resonators. The resonators on a same row are coupled and connected to form signal transmission, and at least two adjacent resonators in different rows are coupled and connected to realize cross-coupling.

10 Claims, 5 Drawing Sheets

(58) Field of Classification Search
CPC ............. H01P 1/20327; H01P 1/20381; H01P 1/20372; H01P 1/207; H01P 7/06; H01P 7/00; H01P 7/04; H01P 7/08
See application file for complete search history.

(56) References Cited

U.S. PATENT DOCUMENTS

| | | | |
|---|---|---|---|
| 2017/0346148 | A1 | 11/2017 | Tamiazzo et al. |
| 2019/0013557 | A1 | 1/2019 | Wu |

FOREIGN PATENT DOCUMENTS

| | | | | |
|---|---|---|---|---|
| CN | 105161804 | A | 12/2015 | |
| CN | 107196023 | A | 9/2017 | |
| CN | 109088135 | A | 12/2018 | |
| WO | WO2004025771 | A1 * | 3/2004 | .............. H01P 1/203 |

* cited by examiner

SINGLE-LAYER CROSS-COUPLED FILTER

CROSS-REFERENCES TO RELATED APPLICATIONS

This application is a continuation application of PCT Patent Application No. PCT/CN2019/072153, filed on Jan. 17, 2019, the entire contents of which are incorporated herein by reference.

FIELD OF THE DISCLOSURE

The present disclosure relates to a filter, in particular to a single-layer cross-coupling filter.

BACKGROUND

With the miniaturization and weight reduction of the filter or when the filter is implemented on a dielectric plane such as a PCB (Printed Circuit Board) or Alumina (aluminum oxide), a resonator with an in-line arrangement such as a strip line or a comb line is usually adopted, which brings many limitations in the realization of cross-coupling. The general way to realize cross-coupling is to add anti-phase coupling to the transmission path to generate a zero point.

As shown in FIG. 7, in a 4-cavity filter composed of four resonators, when the signal is transmitted through inductive coupling in the resonator 1-2-3-4, adding the capacitive coupling of the resonators 1-4 in the inductive coupling path with the order of the resonator 1-2-3-4 results in the passband in FIG. 8, the low frequency and high frequency of the passband generate two zero points due to opposite phases. This implementation is difficult to realize in a planar linear arrangement structure.

In existing technologies, as shown in FIG. 9, in a planar linear arrangement structure of the resonant rod, to realize cross-coupling, it is necessary to install the open-circuited or short-circuited structural part between non-adjacent resonant rods, and the structural part is generally inserted or bonded in the insulator and then fixed on the resonant rod or ground surface, or directly fixed on the resonator. However, this way needs to use the insulator and its assembly to fix the structure in the open-circuited form, and to fix the assembly, needs to increase the processing of the installation part, which increases the processing and production costs, and the processing and assembly tolerances also causes the degradation of filter performance. The short-circuited cross-coupling requires welding or bonding of the structural part on the resonator, and the structural part also needs to be bent over a certain length. This bending increases the height of the overall product, and the amount and the position of the solder during soldering also affects the performance of the filter.

SUMMARY

The embodiments of the present disclosure can overcome the defects of the prior art and provide a single-layer cross-coupling filter having a smaller size and which facilitates cross-coupling.

One aspect of the present disclosure provides a single-layer cross-coupling filter, including: a cavity in which a receiving space is formed; an integrally formed resonant structure installed in the receiving space; and at least one partition wall. The resonant structure includes at least two rows of resonant units distributed along a signal transmission path. The at least two rows of resonant units are located in a same plane of the receiving space, and each row of the resonant units includes a plurality of resonators. The resonators on a same row are coupled and connected to form signal transmission, and at least two adjacent resonators in different rows are coupled and connected to realize cross-coupling.

In some embodiments, each resonator comprises a body part and a bending part, one end of the body part is grounded. The bending part includes a head bending part and an end bending part. The head bending part and the end bending part are connected to form a resonator structure circulating in a counterclockwise or clockwise direction. In some embodiments the bending part further includes at least a middle bending part, and the at least one middle bending part connects the head bending part and the end bending part to form the resonator structure circulating in a counterclockwise or clockwise direction.

In some embodiments, the head bending part is formed by bending the other end of the body part in one direction or two directions.

In some embodiments, the signal transmission path is U-shaped or S-shaped.

In some embodiments, one end of each body part of the plurality of resonators is grounded.

In some embodiments, the body parts of the two adjacent resonators in the different rows are integrally connected through the coupling window to form inductive cross-coupling.

In some embodiments, the bending parts of two adjacent resonators in different rows are spaced by a distance, and the spaced bending parts form capacitive cross-coupling through the coupling window.

In some embodiments, the filter further comprises a signal input port and a signal output port respectively arranged at two ends of the signal transmission path.

In some embodiments, the resonant structure is fixed in the cavity by at least one of a screw, solder, laser welding, friction welding, or a vacuum welding structure.

In some embodiments, a plurality of screw bores are formed on the resonant structure, and a corresponding screw fixing part is disposed at a position on a bottom of the cavity corresponding to the screw bore, the screw fixes the resonant structure into the cavity through the screw bore and the screw fixing part.

The beneficial effects of the present disclosure are:

1. The single-layer strip line structure is used to realize the filter, and the structure of each strip line resonator is designed to have a plurality of bending parts, which has a significant effect on the miniaturization of the filter, and compared to the multi-layer structure, the single-layer filter structure reduces the overall height, reduces the assembly time and cost, reduces the cumulative tolerance and assembly tolerance, and reduces the contact loss.

2. The shape of each resonator can be changed and designed as needed, and the coupling way between the resonators can be freely designed according to the shape of the resonator; in addition, the signal transmission path can be freely changed in conjunction with the partition wall, and the free change of the transmission path can freely select the design positions of the signal input/output ports can be freely selected, which improves the overall design flexibility of the filter.

3. The opening of the partition wall can be used to realize the cross-coupling between non-adjacent resonators without adding structural parts, therefore, the processing and assembly tolerances caused by the structural parts can be reduced, and the processing difficulty of the product can be reduced, and the processing and assembly costs can also be greatly reduced.

REFERENCE NUMERALS

1. cavity, 11. receiving space, 12. screw fixing part, 2. resonant structure, 21. screw bore, 22/2*a*~2*f*. resonator, 221. body part, 222. head bending part, 223. end bending part, 224. middle bending part, 3. partition wall, 31. coupling gap, 4. screw structure, 5. coupling window, 6. electrical connection part, 7. magnetic connection part, 8. signal input port, 9. signal output port.

DETAILED DESCRIPTION

The technical solutions of the embodiments of the present disclosure will be clearly and completely described below in conjunction with the drawings of the present disclosure.

A single-layer cross-coupling filter disclosed in the present disclosure makes an improved design of the shape of the resonator, integrally forms a single-layer resonant unit structure composed of the resonators, and adds cross-coupling between the non-adjacent resonators of the single-layer resonant unit structure to realize the smaller size of the filter, at the same time, to also realize the following effects: 1. cross-coupling without additional conductors, which reduces the processing and assembly costs, as well as processing and assembly tolerances; 2. adding cross-coupling between non-adjacent resonators can be controlled separately, so the design and production become simple; 3. the reduction of the whole height of the single-layer filter compared to the multiple-layer structure, the reduction of the processing and assembly tolerances requirement during the assembly and soldering, and the reduction of contact loss.

Figure 1:
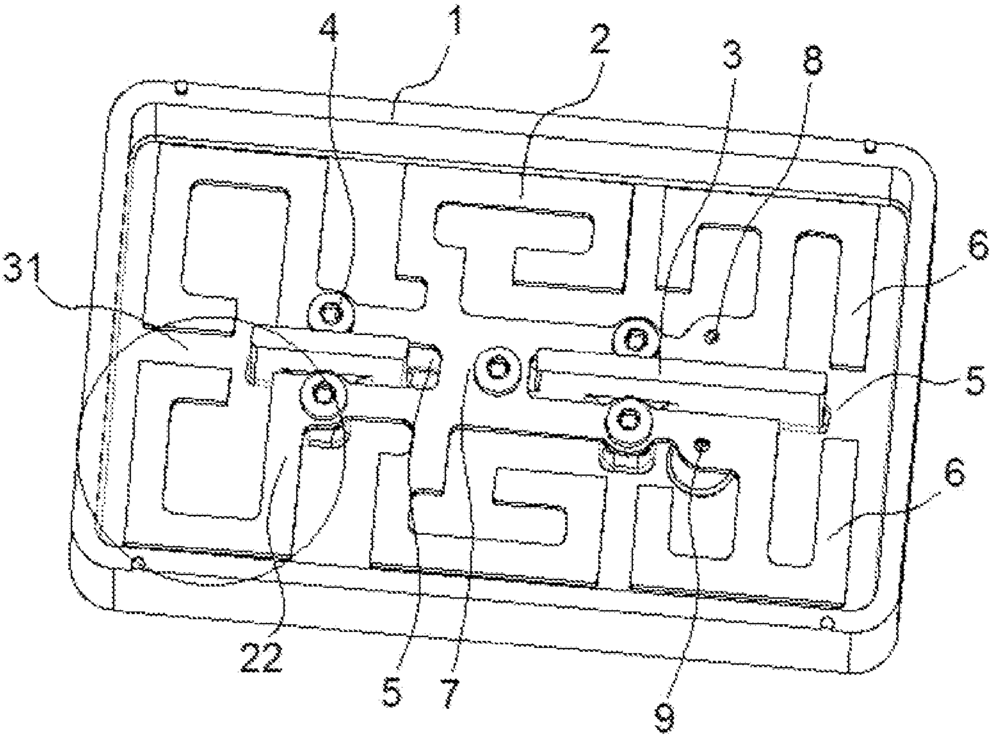
FIG. 1 is a perspective view of an example filter without a cover plate according to an embodiment of the present disclosure.
Figure 2:
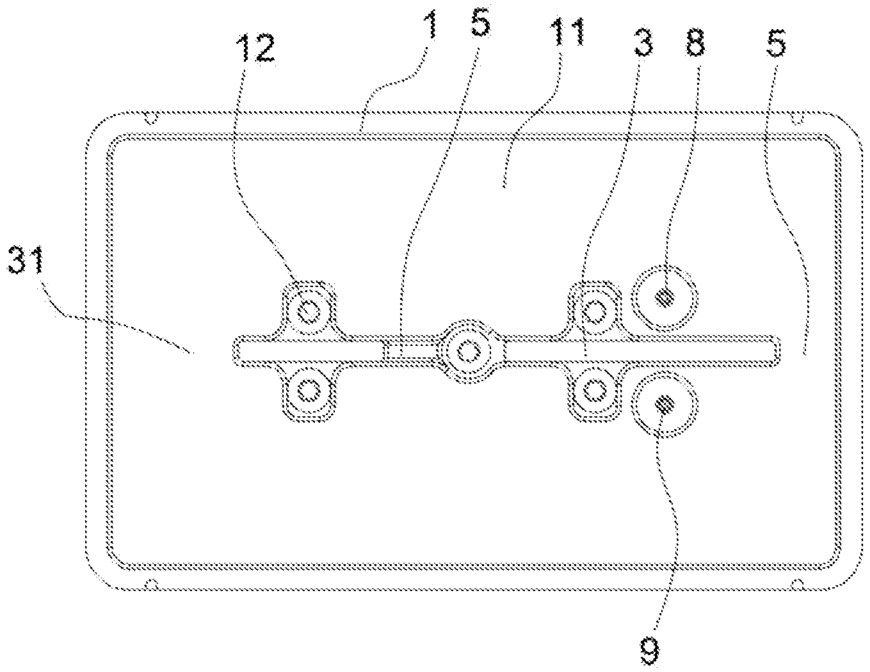
FIG. 2 is a structural view of an example cavity according to an embodiment of the present disclosure.
Figure 3:
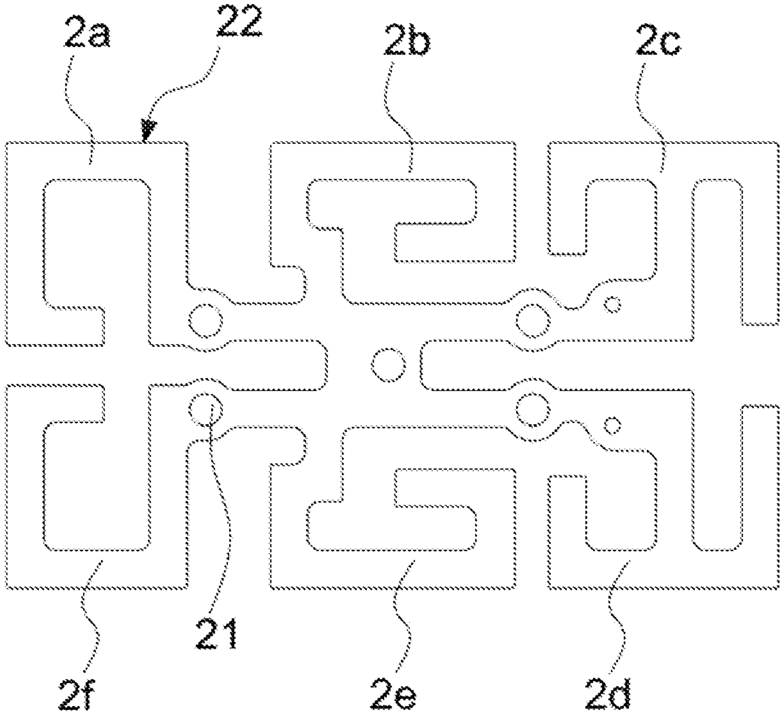
FIG. 3 is a structural view of an example resonant structure according to an embodiment of the present disclosure.

As shown in FIGS. 1 to 3, an example single-layer cross-coupling filter disclosed in the present disclosure comprises a cavity 1, a resonant structure 2 and a partition wall 3, as shown in FIG. 2, the top opening of the cavity 1 can also be replaced with both the top opening and the bottom end opening, the cavity 1 is formed with a receiving space 11 for accommodating the resonant structure 2, the cavity 1 can be processed by milling or die-casting. And the cavity 1 can be a dielectric, such as a ceramic medium or a PCB, or can be changed to other material with a conductive surface, such as a bending aluminum foil.

As shown in FIG. 1, the resonant structure 2 is fixed in the receiving space 11 of the cavity, and the resonant structure 2 itself is integrally formed as a single-layer planar strip line body, the plane where the resonant structure 2 is located after installing in the cavity 1 is parallel or approximately parallel to the bottom surface of the cavity 1. The resonant structure 2 includes a plurality of rows (that is, at least two rows) of resonant units, and the plurality of rows of resonant units extend along a side wall of the cavity 1 to the other side wall opposite to the side wall in the receiving space 11, such as distribute along the front and rear directions of the front and rear side walls of the cavity 1, or distribute along the left and right directions of the left and right side walls of the cavity 1 in the same plane which is parallel or approximately parallel to the bottom surface of the cavity 1. When manufacturing the single-layer planar strip line body, various processing methods such as milling, wire cutting, etching, etc., or mold opening can be used.

In this embodiment, the resonant structure 2 is separately fixed into the cavity 1 via screws 4, for example, a plurality of screw bores 21 are formed on the resonant structure 2, and corresponding screw fixing parts 12 are disposed in the positions of the bottom of the cavity 1 corresponding to the screw bores, the screw 4 passes through the screw hole 21 and the screw fixing part 12 to fix the resonant structure 2 in the cavity 1. It can be understood that, the present disclosure is not limited to the structure fixed by the screw 4, other assembly methods such as soldering, laser welding, friction welding, vacuum welding, etc., are also applicable to the present disclosure, as tong as can realize that the resonant structure 2 can be fixed into the cavity separately, and also be integrally formed in the cavity 1.

Figure 4:
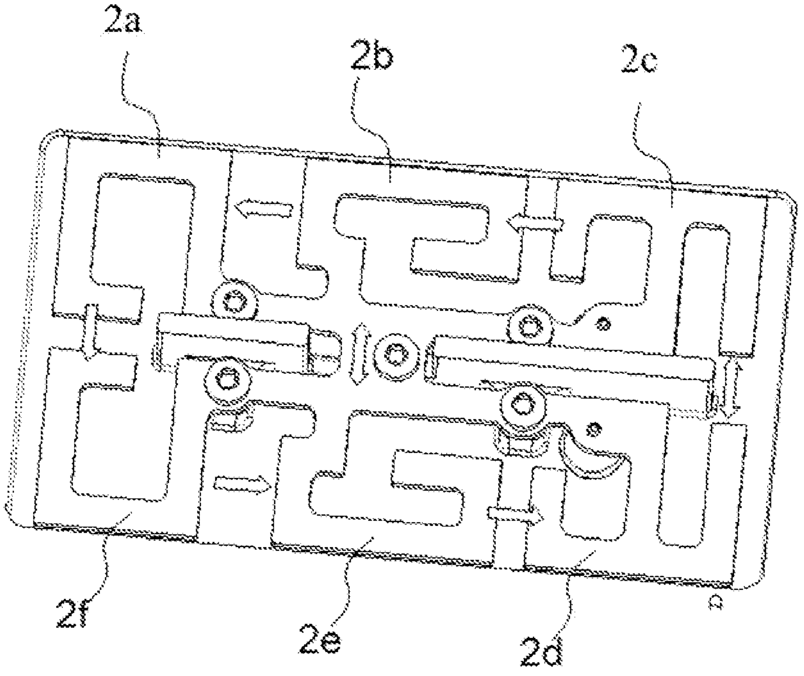
FIG. 4 is a schematic illustration of a transmission path of the filter according to an embodiment the present disclosure.

Each row resonant unit further includes a plurality of resonators 22, and the plurality of resonators 22 in the resonant structure 2 are distributed according to a signal transmission path, and the signal transmission path may be U-shaped or S-shaped. As shown in FIG. 4, the arrow in the figure indicates the coupling transmission path between resonators 22, which is formed in a U shape, the area and spacing of adjacent strip line resonators 22 determine the coupling strength between the two. It can be understood that, the resonant structure 2 may also be a structure of over three rows of resonant units, and the transmission path may be formed by a plurality of continuous U-shaped or S-shaped curved paths.

Figure 5:
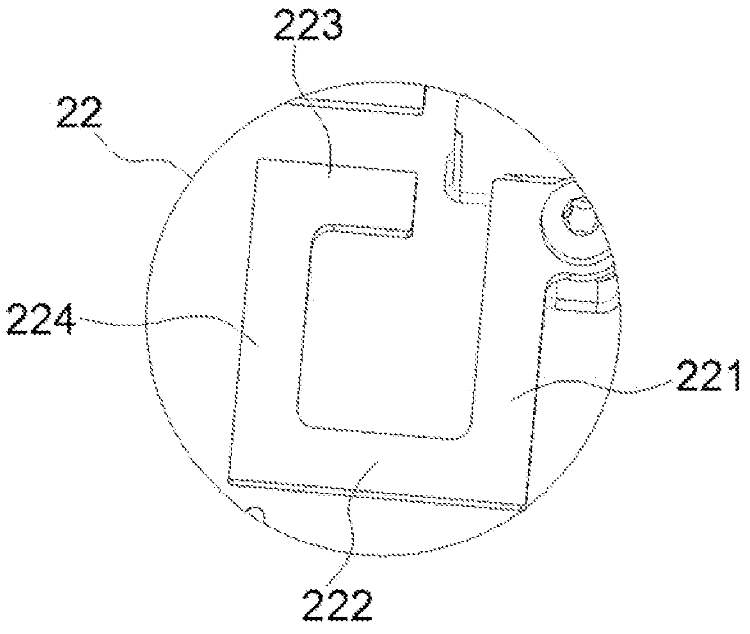
FIG. 5 is a view of a partial enlarged portion of the structure in FIG. 1.
Figure 6:
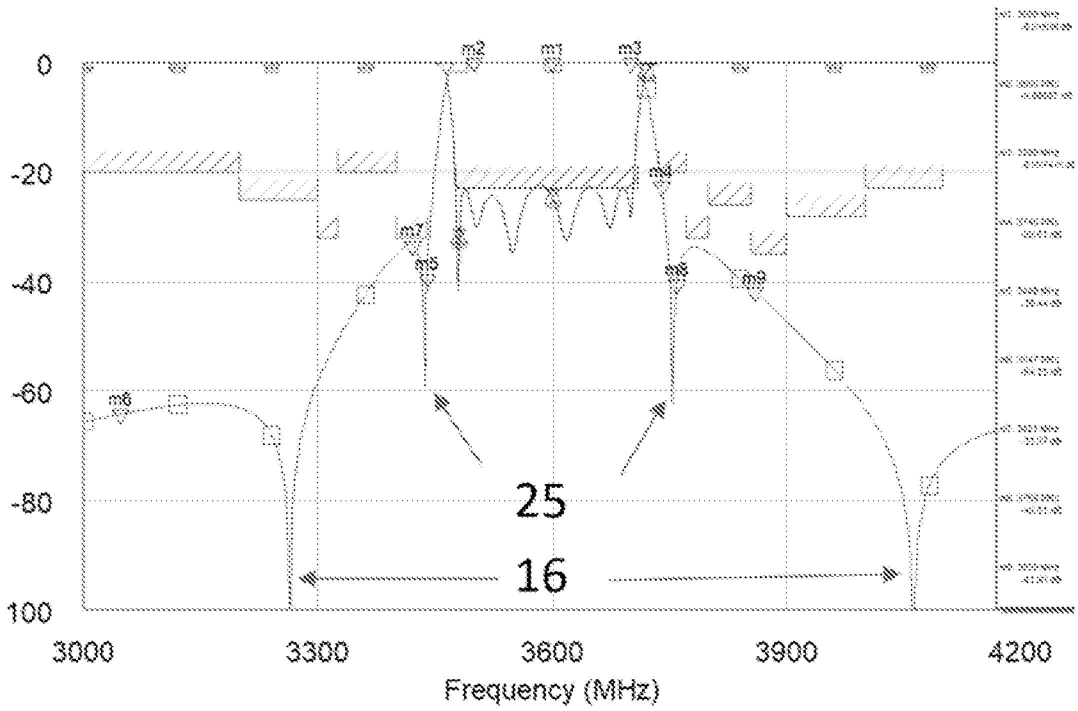
FIG. 6 is a corresponding electrical performance curve according to an embodiment the present disclosure.
Figure 7:
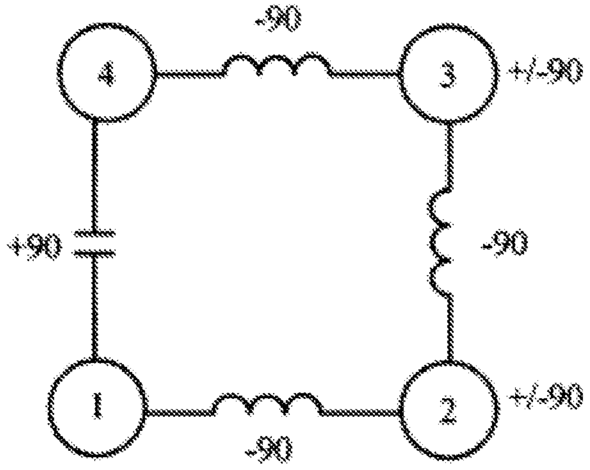
Fig.7 (Prior Art)
FIG. 7 is a structural view of an existing 4-cavity filter.
Figure 8:
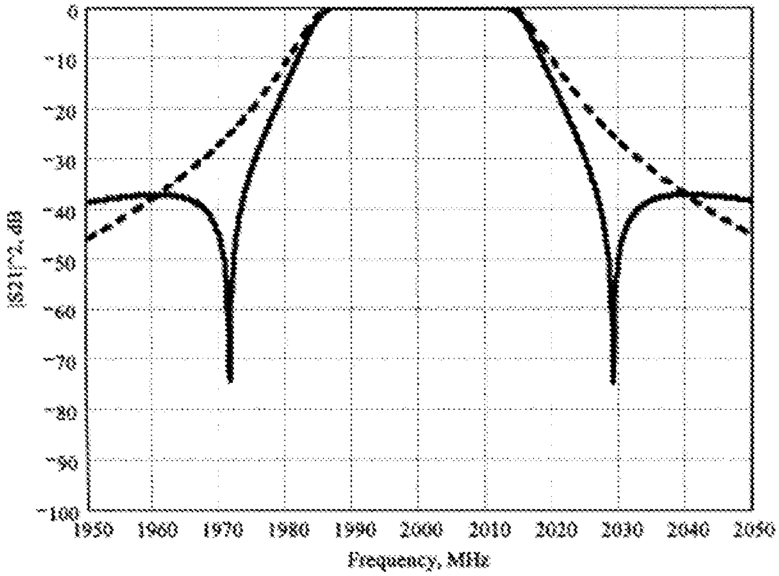
Fig. 8 (Prior Art)
FIG. 8 is a corresponding electrical performance curve of FIG. 7.
Figure 9:
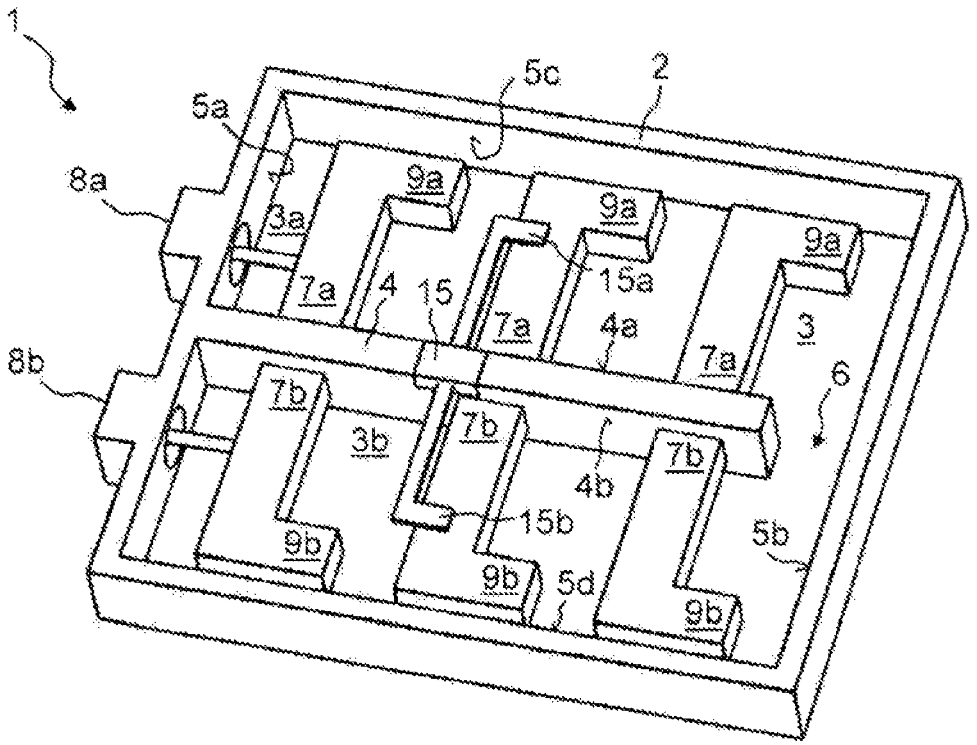
Fig.9 (Prior Art)
FIG. 9 is a view of a conventional planar linear arrangement resonant rod structure.

As shown in FIG. 5, each resonator 22 includes a body part 221 and a bending part, wherein one ends of the body parts 221 of a plurality of resonators 22 of each row resonant unit are grounded, and the bending part is connected to the other end of the body part 221, the bending shape of the bending part can be freely changed and designed according to actual needs, there is no restriction here, that is, the shape of the resonator 22 can be bent to form various designs as required. In some embodiments, as shown in FIG. 4, the bending part includes a head bending part 222 and an end bending part 223, wherein the head bending part 222 is formed by bending the other end of the body part 221 in one or two directions; the head bending part 222 and the end bending part 223 are connected to form a resonator structure circulating in a counterclockwise or clockwise direction. Alternatively, as an alternative, the bending part may include at least one middle bending part 224 in addition to the head bending part 222 and the end bending part 223, wherein the head bending part 222 is formed by bending the other end of the body part 221 in one or two directions, and the middle bending part 224 connects the head bending part 222 and the end bending part 223 to form a resonator structure circulating in a counterclockwise or clockwise direction.

As shown in FIG. 1, a $6^{th}$-order filter with a single-layer planar structure of the embodiment 1 includes two rows of resonant units, and each row resonant unit includes 3 resonators (resonators 2*a*-2*c*, resonators 2*d*-2*f*), that is, the $6^{th}$-order filter includes 6 resonators (resonators 2*a*-2*f*), and one ends of the body parts 221 of the resonators 2*a*-2*f* are all grounded. As shown in FIG. 5, the bending part is connected to the other end of the body part 221 to form a resonator structure circulating in a counterclockwise or clockwise direction. For example, the bending part is connected to the other end of the body part 221 to form a resonator structure by perpendicularly bending the bending part in a clockwise or counterclockwise direction to form at least three bendings, that is, the bending part includes a head bending part 222, a middle bending part 224 and an end bending part 223, wherein the head bending part 222 is connected to the other end of the body part 221 to form a perpendicular bending, the middle bending part is connected to the end of the head bending part 222 to form a perpendicular/vertical bending, and the end bending part 223 is connected to the end of the middle bending part 224 to form a perpendicular bending. Compared with the existing L-shaped and T-shaped resonators, the resonator structure designed in the present disclosure can realize the smaller size of the filter, and the lower frequency of the filter. In some embodiments, the bending part is thickened in the direction perpendicular to the upper and lower ends of the cavity, even if the thickness of the bending part is greater than the thickness of the body part 221, which can further reduce the volume of the resonator under the requirement of the same frequency.

Among them, the specific coupling mode of the electromagnetic hybrid coupling connection between two adjacent resonators 22 in the above-mentioned signal transmission path is determined by the shape and the mutual coupling position of the resonators 22. It should be noted that the general coupling of a TEM mode filter is the coexistence of electrical coupling and magnetic coupling, the one with the larger amount of coupling of the two couplings is called dominant coupling, the dominant coupling mode of the filter of the present disclosure can be determined by the coupling position of the two coupled resonators 22. Referring to the 6th-order filter with a single-layer planar structure shown in FIGS. 1 and 4, according to the shape design of the resonator 22, the formed signal transmission path is a U-shaped path formed by the resonators 2*a*-2*f*.

The partition wall 3 is disposed between two adjacent rows of resonant units, and is used to isolate the coupling between the different rows of resonators 22. The partition wall 3 is integrally formed with the cavity 1, and can be integrally formed on the bottom of the cavity L In some embodiments, two adjacent resonators in different rows may be consecutive resonators located on the signal transmission path, such as resonators 2*a* and 2*f* shown in FIG. 4. In this case, the partition wall 3 is not in contact with an inner wall of the cavity 1 to form a coupling gap 31. In this way, main coupling between the resonators 2*a* and 2*f* is formed through the coupling gap 31. Main coupling, as used herein, may refer to coupling of consecutive resonators on the signal transmission path. Cross-coupling, as used herein, may refer to coupling of adjacent resonators that are not consecutive resonators on the signal transmission path. In some embodiments, at least one group from a plurality of groups of adjacent resonators in different rows is coupled to realize cross-coupling. In other words, two resonators in adjacent rows may be coupled to realize cross-coupling. As shown in FIGS. 1 and 2, a coupling window 5 is formed on the partition wall 3, and two adjacent resonators in different rows (such as the resonators 2*c* and 2*d*) form a cross-coupling through the respective coupling window 5. In this embodiment, a coupling window 5 is disposed at a position on the partition wall 3 corresponding to the resonators 2*b* and 2*e*, and a coupling window 5 is also disposed at a position on the partition wall 3 corresponding to the resonators 2*c* and 2*d*.

Further, two adjacent resonators in different rows form inductive cross-coupling or capacitive cross-coupling. Specifically, the body parts of two adjacent resonators in different rows are integrally connected through the coupling window to form inductive cross-coupling; the bending parts of two adjacent resonators in different rows are spaced by a certain distance, the spaced bending parts form capacitive cross-coupling through the coupling window.

In the $6^{th}$-order filter shown in FIGS. 1, 3 and 4, there are two groups of adjacent resonators in the two rows of resonant units, namely resonators 2*c* and 2*d*, and resonators 2*b* and 2*e*, any group or two groups of the two groups of resonators are selected to be coupled and connected to realize cross-coupling. The cross-coupling between the resonators 2*b* and 2*e* is added to the main-coupling path of the six resonators 2*a*-2*f* (the main coupling path being the signal transmission path that starts with 2*c*, sequentially followed by 2*b*, 2*a*, 2*f*, 2*e*, and ends with 2*d*), in one embodiment, a coupling window 5 is disposed on the partition wall between the resonators 2*b* and 2*e*, the body parts 221 between the resonators 2*b* and 2*e* is integrally connected to form a magnetic coupling and/or electrical coupling through the coupling window 5, that is, the inductive cross-coupling and/or capacitive cross-coupling is added to form two transmission zero points. The coupling between the resonators 2*c* and 2*d* is added to the main coupling path of the resonators 2*a*~2*f*, in one embodiment, the ends of the bending parts of the resonators 2*c* and 2*d* are spaced by a certain distance, and the two spaced bending parts form capacitive cross-coupling and/or inductive cross-coupling through the coupling window 5.

In some other embodiments, at locations where cross-coupling is not needed, there is no coupling window 5 formed on the partition wall 3 between two adjacent resonators in different rows, to avoid cross-coupling between said two resonators.

The above-mentioned transmission zero point is generated by adding anti-phase cross-coupling in the main coupling path, to realize such cross-coupling, a general transverse electromagnetic wave (TEM) mode planar structure filter may be made into multiple layers and then add gap coupling between the layers, or add a conductor (a flying rod) between non-adjacent resonators, the present disclosure does not use stacking or adding flying rods, but only controls the dominant coupling by the design of the resonator shape to realize capacitive cross-coupling or inductive cross-coupling.

Further, the single-layer cross-coupling filter, as shown in FIGS. 1 and 2, further includes a signal input port 8 and a signal output port 9, these two ports 8, 9 are respectively arranged at two ends of the above-mentioned signal transmission path, depending on different signal transmission paths, the setting positions of the two ports can also be different accordingly. In the above embodiment, the two ports are arranged at the resonators 2*a* and 2*f*, during implementation, the signal input port 8 and the signal output port 9 can have various forms, in this embodiment, after the connector core is inserted into the insulator, the two ports are assembled on the bottom of the cavity and then soldered to the strip line resonator 22, this structure can be a complete RF connector, that is, the resonators 2$a$ and 2$f$ are each soldered with a RF connector. It can also be a printed board welding form or a joint form.

The present disclosure uses a single-layer strip line structure to realize a filter, and a plurality of cross-coupling is added to the transmission path of the entire filter, so as to realize that a zero point is added on both sides of the bandwidth when each cross-coupling is added. Compared to the multi-layer structure, the single-layer cross-coupling reduces the overall height, the processing and assembly tolerance requirements of the assembly or welding engineering, and the contact loss. And there is no need to add additional conductors to realize cross-coupling to reduce processing and assembly costs and processing and assembly tolerances. In addition, the cross-coupling between non-adjacent resonators can also be controlled separately, so the design and manufacture of the filter becomes simpler.

The technical content and technical features of the present disclosure have been disclosed above, however, those skilled in the art may still make various substitutions and modifications based on the teachings and disclosures of the present disclosure without departing from the spirit of the present disclosure, therefore, the protection scope of the present disclosure should not be limited to the content disclosed in the embodiments, but should include various substitutions and modifications which are covered by the claims of this patent application without departing from the present disclosure.

What is claimed is:

1. A single-layer cross-coupling filter, comprising:

a cavity in which a receiving space is formed;

a resonant structure installed in the receiving space, and including at least a first and a second rows of resonant units distributed along a signal transmission path, each of the first and the second rows of the resonant units including a left, a middle, and a right resonators, wherein the signal transmission is formed along the first row and the second row, and a cross-coupling is formed between the first row and the second row; and at least one partition wall arranged between the first and the second rows of the resonant units, wherein a coupling window is formed on the partition wall, the left, the middle, or the right resonator of the first row is respectively connected to the left, the middle, or the right resonator of the second row through the coupling window to form the cross-coupling, wherein each resonator comprises a body part and a bending part, and the bending part comprises a head bending part and an end bending part, and wherein the body parts of the middle resonators in the first and the second rows are connected through the coupling window to form inductive cross-coupling.

2. The single-layer cross-coupling filter according to claim 1, wherein the head bending part is formed by bending the other end of the body part in one direction or two directions.

3. The single-layer cross-coupled filter according to claim 1, wherein the signal transmission path is U-shaped or S-shaped.

4. The single-layer cross-coupled filter according to claim 1, wherein one end of each body part of the plurality of resonators is grounded.

5. The single-layer cross-coupled filter according to claim 1, wherein the filter further comprises a signal input port and a signal output port respectively arranged at two ends of the signal transmission path.

6. The single-layer cross-coupling filter according to claim 1, wherein the resonant structure is fixed in the cavity by at least one of a screw, solder, laser welding, friction welding, or a vacuum welding structure.

7. The single-layer cross-coupled filter according to claim 1, wherein at least one screw bore is formed on the resonant structure, and a corresponding screw fixing part is disposed at a position on a bottom of the cavity corresponding to the screw bore, the resonant structure is fixed into the cavity through the screw bore and the screw fixing part.

8. The single-layer cross-coupling filter according to claim 1, wherein the bending part further comprises a middle bending part positioned between the head bending part and the end bending part, the middle bending part is positioned at an angle relative to the head bending part and at another angle relative to the end bending part.

9. The single-layer cross-coupling filter according to claim 1, wherein the middle resonator of the first row is connected to the middle resonator of the second row through the coupling window to form the cross-coupling.

10. The single-layer cross-coupling filter according to claim 1, wherein the left or the right resonator of the first row is respectively connected to the left or the right resonator of the second row through the coupling window to form the cross-coupling.

* * * * *